(12) United States Patent
Cheng

(10) Patent No.: US 6,923,686 B1
(45) Date of Patent: Aug. 2, 2005

(54) ROTATABLE ONBOARD MOBILE PHONE CHARGER

(75) Inventor: Chin-Hung Cheng, Chung Ho (TW)

(73) Assignee: Lucent Trans Electronic Co. Ltd., Chung Ho (TW)

( * ) Notice: Subject to any disclaimer, the term of this patent is extended or adjusted under 35 U.S.C. 154(b) by 32 days.

(21) Appl. No.: 10/805,550

(22) Filed: Mar. 19, 2004

(51) Int. Cl.[7] .......................................... H01R 24/04
(52) U.S. Cl. ...................... 439/668; 439/529; 379/446
(58) Field of Search ............................. 439/668, 529, 439/11; 379/446, 454

(56) References Cited

U.S. PATENT DOCUMENTS

| | | | | |
|---|---|---|---|---|
| 5,086,958 A | * | 2/1992 | Nagy | 224/544 |
| 5,179,590 A | * | 1/1993 | Wang | 379/454 |
| 5,414,770 A | * | 5/1995 | Wang | 379/446 |
| 5,642,402 A | * | 6/1997 | Vilmi et al. | 455/569.2 |
| 5,687,234 A | * | 11/1997 | Chang | 379/454 |
| 5,736,830 A | * | 4/1998 | Weng | 320/108 |
| 5,829,993 A | * | 11/1998 | Wu | 439/131 |
| 5,839,919 A | * | 11/1998 | Chen | 439/529 |
| 5,847,545 A | * | 12/1998 | Chen et al. | 320/138 |
| 5,860,824 A | * | 1/1999 | Fan | 439/265 |
| 5,918,187 A | * | 6/1999 | Weng | 455/573 |
| 5,967,807 A | * | 10/1999 | Wu | 439/131 |
| 6,076,000 A | * | 6/2000 | Lee | 455/569.2 |
| 6,138,041 A | * | 10/2000 | Yahia | 455/569.2 |
| 6,312,284 B1 | * | 11/2001 | Tsay | 439/529 |
| 6,317,497 B1 | * | 11/2001 | Ou | 379/454 |
| 6,366,672 B1 | * | 4/2002 | Tsay | 379/446 |
| 6,443,774 B1 | * | 9/2002 | Ou | 439/668 |
| 6,478,276 B1 | * | 11/2002 | Louh | 248/309.1 |
| 6,478,628 B1 | * | 11/2002 | Ming | 439/668 |
| 6,480,378 B2 | * | 11/2002 | Chang | 361/686 |
| 6,512,826 B1 | * | 1/2003 | Kim | 379/420.04 |
| 6,551,142 B2 | * | 4/2003 | Eisenbraun | 439/668 |
| 6,616,470 B2 | * | 9/2003 | Lu et al. | 439/265 |
| 6,641,405 B2 | * | 11/2003 | Chou | 439/32 |
| 6,687,513 B1 | * | 2/2004 | Hsu Li | 455/557 |
| 6,695,648 B2 | * | 2/2004 | Liao | 439/668 |
| 6,762,585 B2 | * | 7/2004 | Liao | 320/107 |
| 6,767,256 B1 | * | 7/2004 | Faerber et al. | 439/668 |

* cited by examiner

Primary Examiner—Ross Gushi
(74) Attorney, Agent, or Firm—Dellett & Walters

(57) ABSTRACT

A mobile phone charger includes a connector having a connection tip formed on a first distal end of the connector and adapted for electrical connection with an onboard cigarette lighter socket and multiple adjusting holes defined in a second distal end opposite to the first distal end of the connector, a body pivotally connected to the second distal end of the connector a power wire electrically connected to the connector and extending out of the body for connection with the mobile phone. The body having a boss selectively extending out of the body to be received in a corresponding one of the adjusting holes to secure engagement between the connector and the body.

19 Claims, 6 Drawing Sheets

ROTATABLE ONBOARD MOBILE PHONE CHARGER

BACKGROUND OF THE INVENTION

1. Field of the Invention

The present invention relates to a mobile phone charger, and more particularly to a rotatable charger adapted for connection with an onboard power source.

2. Description of Related Art

Mobile phone chargers are usually classified into two different categories, one has a seat for receiving therein the mobile phone and the other one has only a cable with a transformer therein. Depending on the situation available, the mobile phone users will choose the best category to charge the mobile phones. In order to facilitate the charging process for those who are onboard a vehicle, such as a car, a charger adapted for use with an onboard cigarette lighter socket is provided. The mobile phone users are able to place the mobile phones on the chargers which are connected to the onboard cigarette lighter socket to recharge the mobile phone. However, after the mobile phone is placed on the charger, the mobile phone is substantially fixed, which often hinders the driver's movement and sometimes even causes an accident if the driver's movement is interrupted.

To overcome the shortcomings, the present invention tends to provide an improved mobile phone charger to mitigate the aforementioned problems.

SUMMARY OF THE INVENTION

The primary objective of the present invention is to provide an improved mobile phone charger adapted for connection with an onboard cigarette lighter socket and having a connector for connection with the cigarette lighter socket and a body pivotally connected to the connector so that after the mobile phone is placed on top of the body, the mobile phone is moved along with the body to best fit the driver's position.

Another objective of the present invention is to provide a holder detachably and rotatably mounted on top of the body to clamp a mobile phone to facilitate access of the mobile phone.

Other objects, advantages and novel features of the invention will become more apparent from the following detailed description when taken in conjunction with the accompanying drawings.

DETAILED DESCRIPTION OF THE PREFERRED EMBODIMENT

Figure 1:
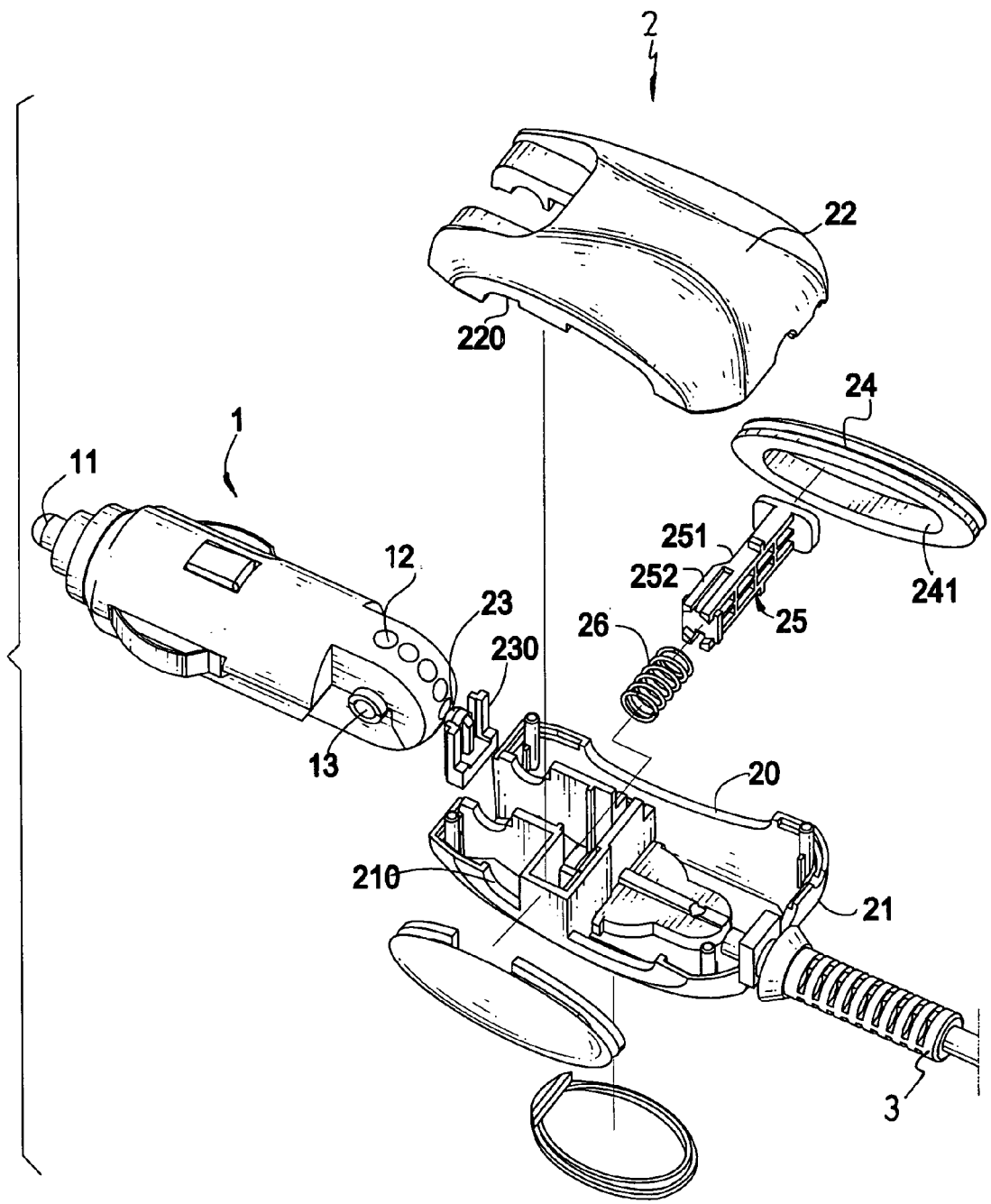
FIG. 1 is an exploded perspective view of the mobile phone charger in accordance with the present invention, wherein the mobile phone is in a reversed manner to best show the inner structure of the body.

With reference to FIG. 1, the mobile phone charger constructed in accordance with the present invention includes a connector (1) adapted for connection with an onboard cigarette lighter socket and a body (2).

The connector (1) has a connection tip (11) extending from a first distal end of the connector (1) for connection with the cigarette lighter socket, multiple adjusting holes (12) defined in a second distal end opposite to the first distal end of the connector (1), and a rotation column (13) formed close to and extending from opposite sides of the second distal end of the connector (1).

The body (2) is substantially hollow and composed of a top cover (21), a bottom cover (22) and two side covers (24) oppositely sandwiched between the top cover (21) and the bottom cover (22). The top cover (21) has two arcuate cutouts (20) respectively defined in two opposite side faces of the top cover (21) to respectively mate a peripheral configuration of the side covers (24), and two first recesses (210) defined in a front portion of the body (2) to correspond to the rotation column (13) of the connector (1). One of the side covers (24) has a recessed area (241) defined in an inner face of the side cover (24) and a bottom face defining the recessed area (241) is made of a resilient material such that the bottom face of the side cover (24) is able to move relative to the other side cover (24). A boss (23) integrally formed on a seat (230) and corresponding to the adjusting holes (12) of the connector (1) is formed on a front end of the body (2). The seat (230) is integrally formed with the front end of the body (2) with the boss (23) extending out of a side face of the seat (230). A driving rod (25) is provided between the two side covers (24) and has a concave portion (251) and a convex portion (252) both formed on a side face of the driving rod (25) and adjacent to each other. A spring (26) is provided between a distal end of the driving rod (25) and a bottom face of the side cover (24). The bottom cover (22) has two second recesses (220) formed to correspond to the first recesses (210) of the top cover (21) and the rotation column (13) of the connector (1).

Figure 2:
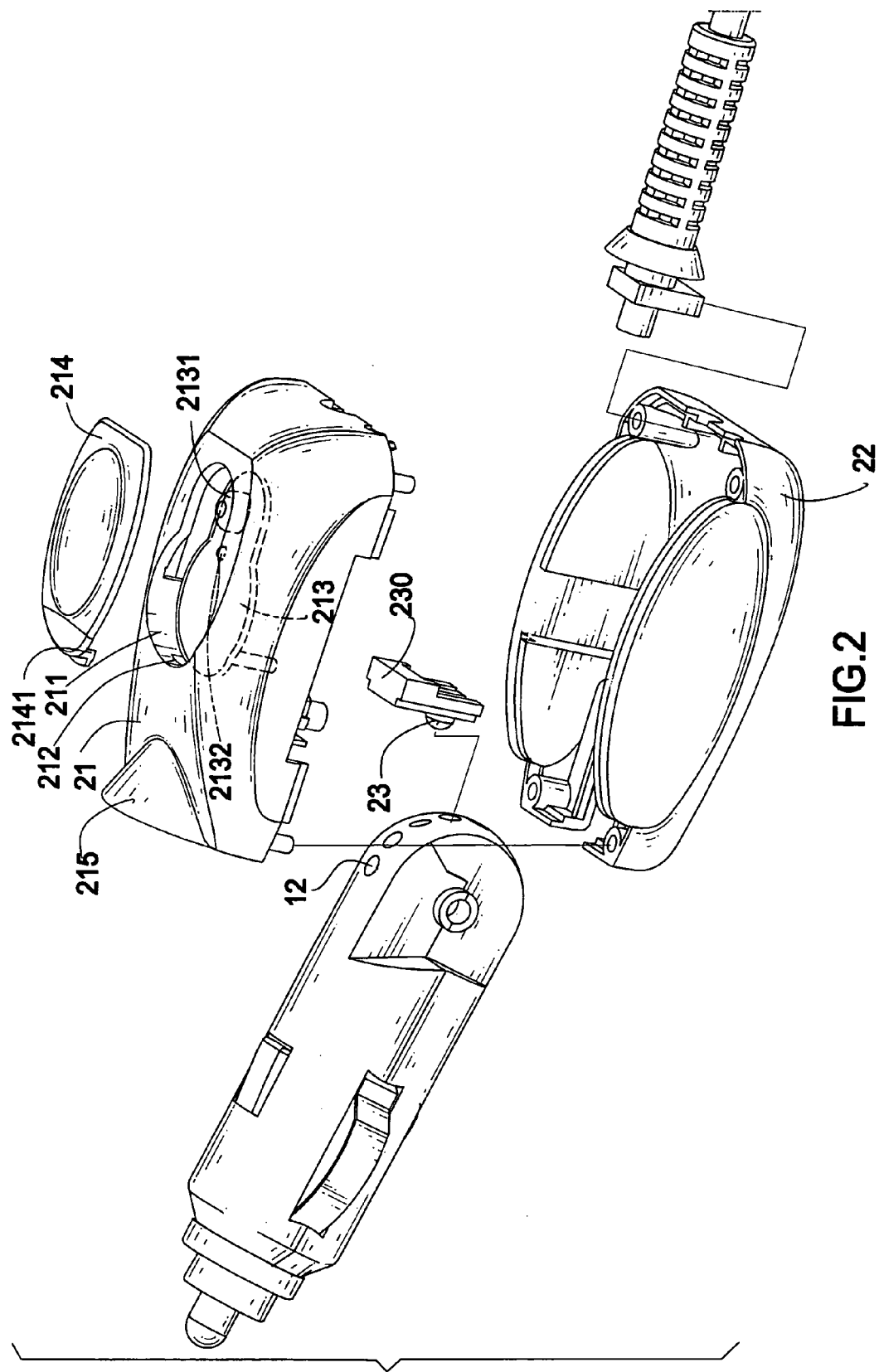
FIG. 2 is an exploded perspective view showing the inner structure of the top cover.

With reference to FIG. 2, the top cover (21) further has a keyhole shaped opening (211) with a lip (212) formed on a periphery of the opening (211). A substantially L-shaped spring board (213) has a first end securely attached to a bottom face of the top cover (21), a first boss (2131) and a second boss (2132) both formed on a top face of the spring board (213) and exposed to the opening (211). The first boss (2131) has a dimension larger than a dimension of the second boss (2132). A cover (214) is configured to have a dimension slightly smaller than that of the opening (211) so that the cover (214) is able to be snugly received in the opening (211). The cover (214) has a tongue (2141) formed on an end of the cover (214) to correspond to the lip (212) in the opening (211). Therefore, when the cover (214) covers the opening (211), the tongue (2141) engaging the lip (211) secures the combination between the cover (214) and the top cover (21).

A power wire (3) is electrically connected to the connector (1) by any appropriate method. Because the connection between the power wire (3) and the connector (1) is conventional in the art, detailed description thereof is thus omitted.

Figure 3:
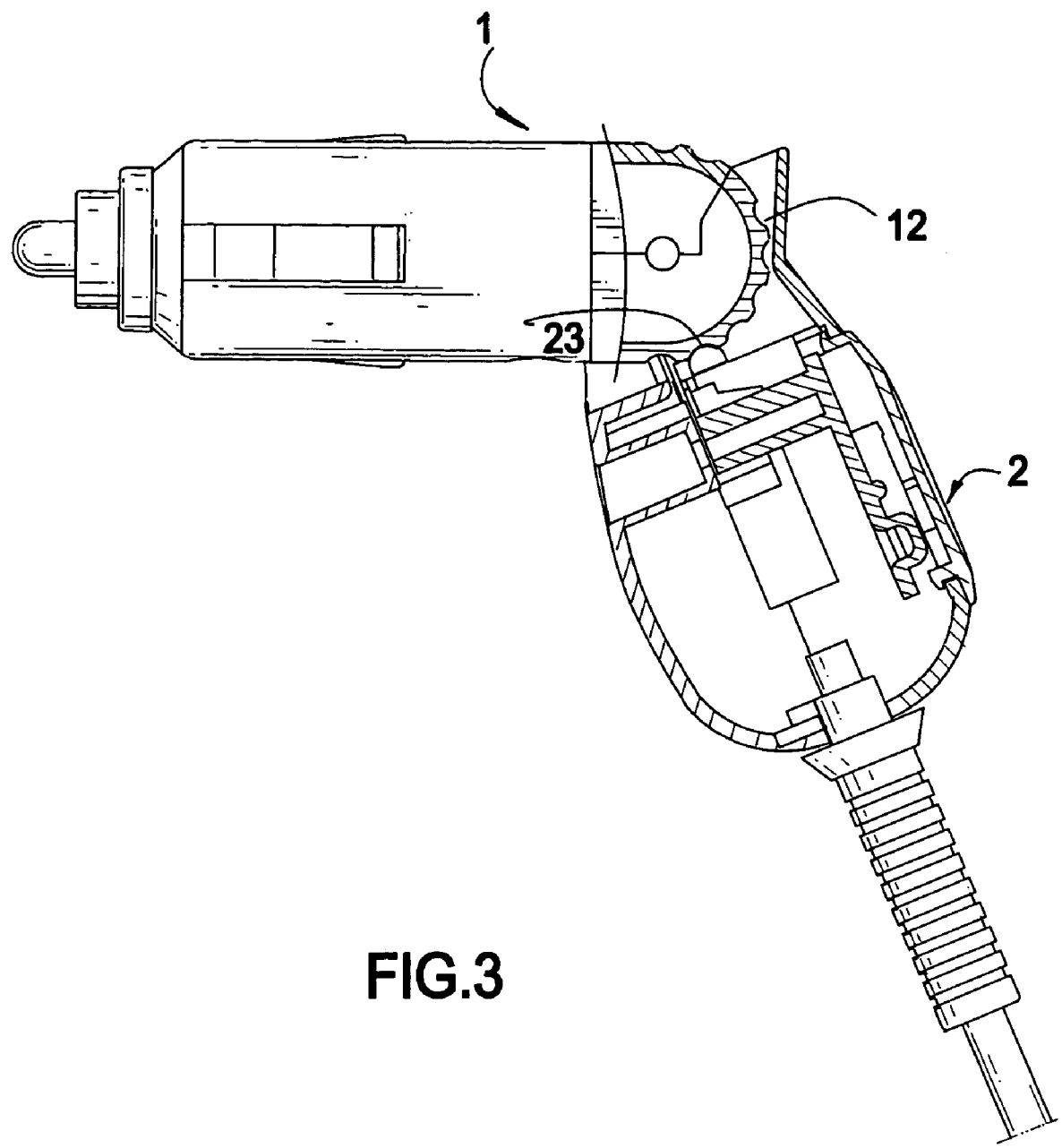
FIG. 3 is a schematic view showing the position of the body in relation to the connector.
Figure 3A:
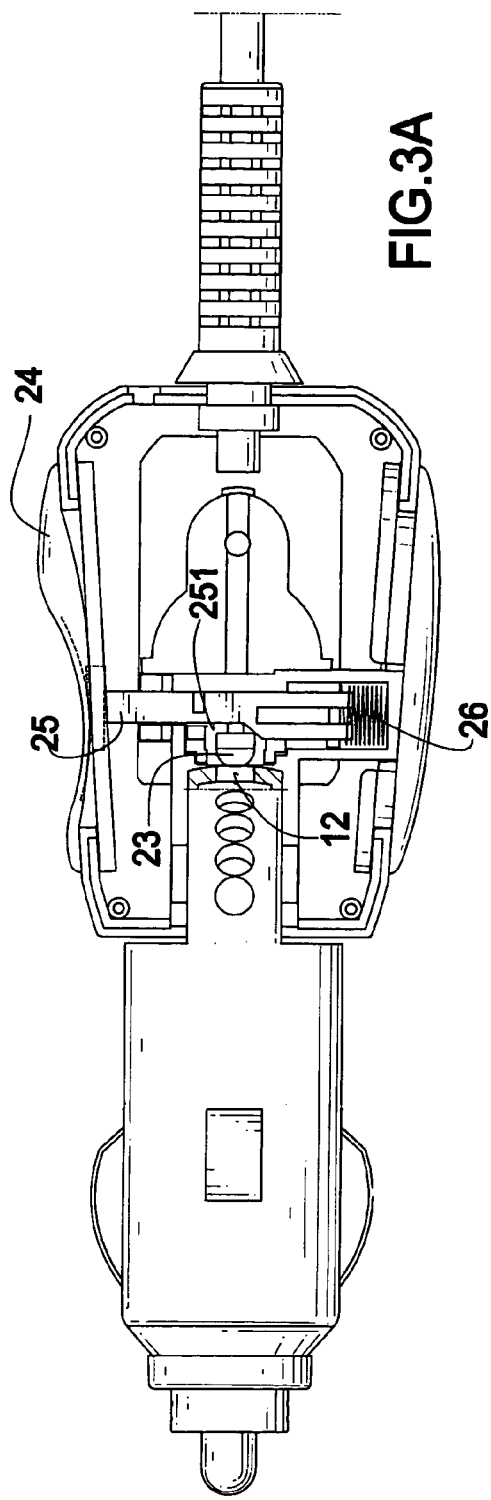
FIGS. 3A and 3B are schematic views showing the interaction between the side cover and the driving rod.
Figure 3B:
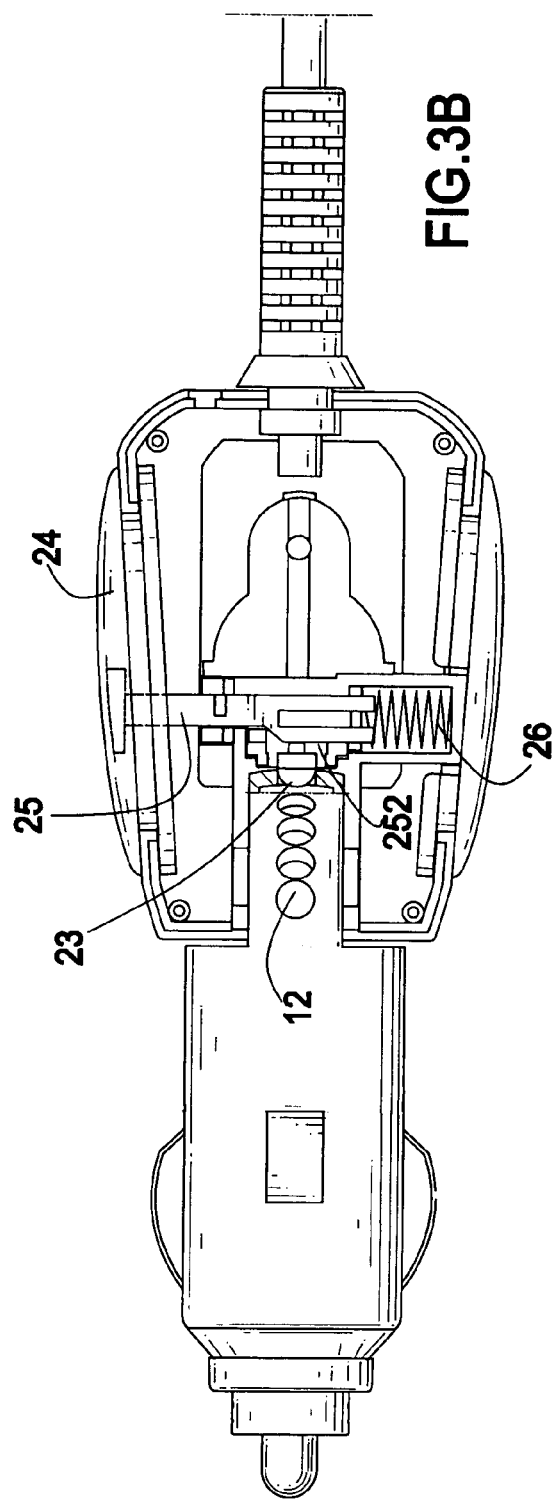
Figure 4:
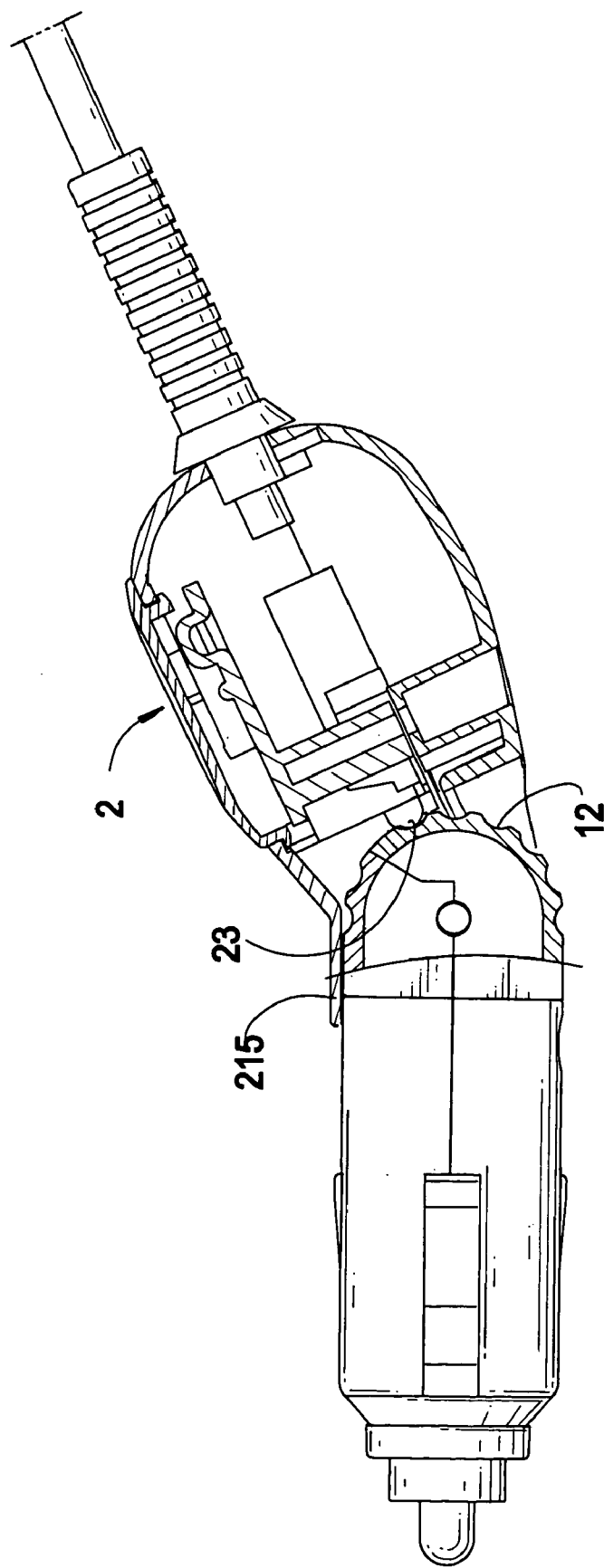
FIG. 4 is a schematic cross sectional view showing the position adjustment of the body relative to the connector.

With reference to FIGS. 3, 3A and 3B, after the connector (1) and the body (2) are connected to each other, it is noted that the first recesses (210) and the second recesses (220) encase the rotation column (13) of the connector (1) such that the body (2) is able to pivot relative to the connector (1) or vice versa. Furthermore, after the combination between the connector (1) and the body (2) is completed, one end of the driving rod (25) abuts the bottom face defining the recessed area (241) and the other end of the driving rod (25) abuts one distal end of the spring (26) the other end of which abuts a side face of the other side cover (24). In the meantime, the protruded area (252) engages the seat (230) to force the boss (23) to extend out of the body (2) and into one of the adjusting holes (12) thereby securing the pivotal relationship between the connector (1) and the body (2). However, when the bottom face defining the recessed area (241) of the side cover (24) is pressed to cause the driving rod (25) to move relative to the spring (26), the seat (230) aligns with the concave portion (251). Because the abutting force to the seat (230) is temporarily removed, the seat (230) along with the boss (23) springs back into the body (2) to allow the body (2) to pivot relative to the connector (1). Further, because the connector (1) normally is inserted into the onboard cigarette lighter socket, the connector (1) is securely fixed. Therefore, the user is able to pivot the body (2) relative to the connector (1) to adjust the body (2) to a position adapted to the user's position. After the body (2) is adjusted by pivoting the body (2) relative to the connector (1), the user removes the pressing force to the side face of the side cover (24) and thereby the recoil force of the spring (26) forces the driving rod (25) to move to the side cover (24) to resume the original position of the driving rod (25), which allows the protruded area (252) to abut the seat (230) again. After the seat (230) is abutted by the protruded area (252), the boss (23) is again forced to extend out of the body (2) and into one of the adjusting holes (12) to once again secure the position between the connector (1) and the body (2), as shown in FIG. 4.

Figure 5:
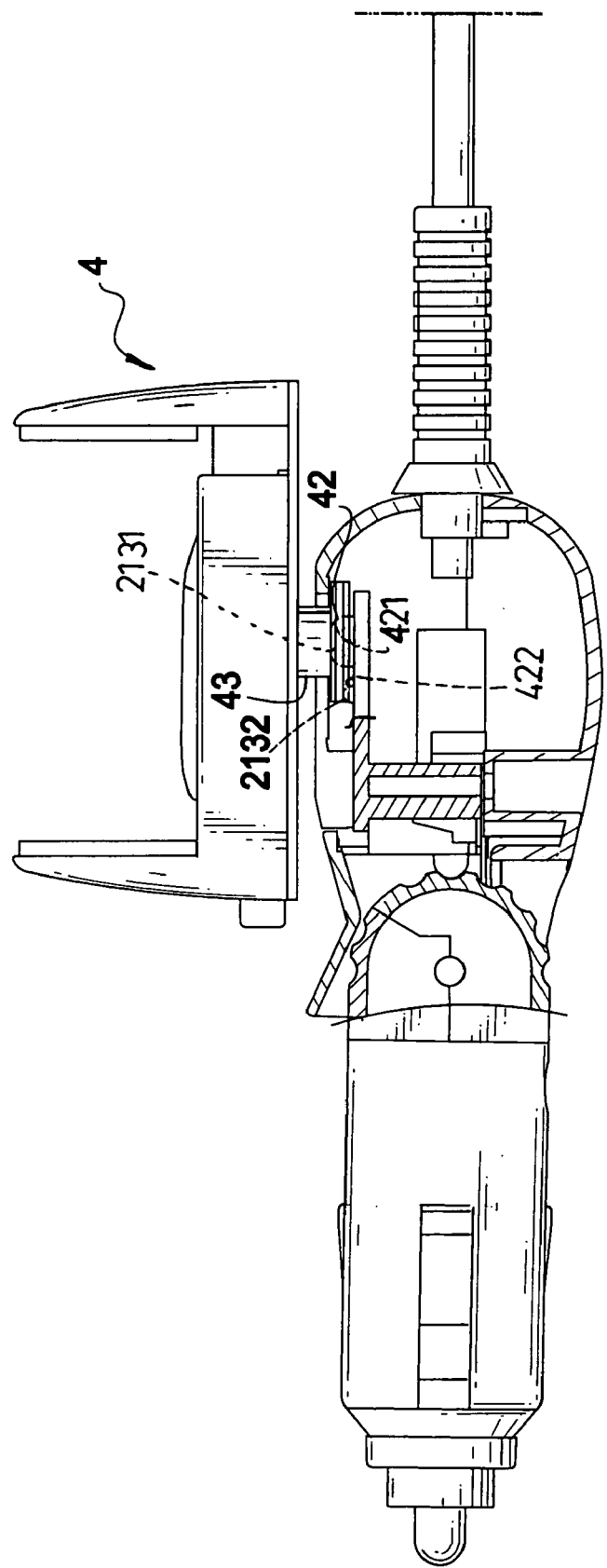
FIG. 5 is a schematic cross sectional view showing the combination of a clamp with the body.

With reference to FIG. 5, a rotation clamp (4) adapted for clamping a mobile phone (not shown) is provided to have a flange (42) connected to a bottom face of the rotation clamp (4) by a neck (43) and having a first concavity (421) defined in a bottom face of the flange (42) to correspond to the first boss (2131) and second concavities (422) also defined in the bottom face of the flange (42) to correspond to the second boss (2132). The first concavity (421) has a dimension slightly larger than that of the first boss (2131) and each second concavity (422) has a dimension slightly larger than that of the second boss (2132) so that the first boss (2131) is able to be received in the corresponding first concavity (421) and the second boss (2132) is able to be received in any one of the corresponding second concavities (422).

When the rotation clamp (4) is to be used with the body (2), the side cover (24) is removed to expose the opening (211). Then the flange (42) is inserted into the opening (211) to allow a peripheral edge to abut a peripheral edge of the opening (211). Meanwhile, the first and second bosses (2131,2132) are respectively received in the first concavity (421) and one of the second concavities (422). Thus, the user is able to use the combination of the connector (1) and the body (2) to hold the mobile phone with the rotation clamp (4) rotatably mounted on top of the body (2). It is to be noted that when the rotation clamp (4) is rotated relative to the body (2), the second boss (2132) sliding through one of the second concavities (422) provides a temporary positioning effect to the rotation clamp (4).

Therefore, not only can the mobile phone be rotated in a latitudinal direction, the mobile phone can also be rotated in a longitudinal direction relative to the connector (1).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile phone charger comprising:
   a connector having a connection tip formed on a first distal end of the connector and adapted for electrical connection with an onboard cigarette lighter socket and multiple adjusting holes defined in a second distal end opposite to the first distal end of the connector;
   a body pivotally connected to the second distal end of the connector and composed of a top cover, a bottom cover, two side covers spaced apart from each other and sandwiched between the top cover and the bottom cover and a power wire electrically connected to the connector and extending out of the body for connection with the mobile phone, the body having a boss selectively extending out of the body to be received in a corresponding one of the adjusting holes to secure engagement between the connector and the body.

2. The mobile phone charger as claimed in claim 1, wherein the boss is provided on a seat which is formed on a bottom face of the top cover.

3. The mobile phone charger as claimed in claim 1, wherein the top cover further has an opening, an L-shaped spring board securely attached to a bottom face of the top cover and provided with a first boss and a second boss both exposed to the opening and a cover detachably covering the opening.

4. The mobile phone charger as claimed in claim 1 further comprising a rotation clamp adapted for holding the mobile phone and rotatably connected to the top cover, the rotation clamp having a flange configured in such a manner that the flange is able to be received in the opening when the cover is removed to allow a peripheral edge abutted to a peripheral edge of the opening, a first concave defined to correspond to the first boss and second concaves corresponding to the second bosses of the spring board.

5. The mobile phone charger as claimed in claim 1, wherein the connector has a rotation column formed on a side face of the second distal end of the connector to be close to the adjusting holes, the top cover and the bottom cover have recesses to encase the rotation column such that the body is able to pivot relative to the connector.

6. The mobile phone charger as claimed in claim 5, wherein the boss is provided on a seat which is formed on a bottom face of the top cover.

7. The mobile phone charger as claimed in claim 5, wherein a driving device is provided inside the body to force the boss to extend out of the body and into the corresponding adjusting hole.

8. The mobile phone charger as claimed in claim 7, wherein the driving device includes a driving rod movably received in the body and having one end abutted to a side face of the side cover, a protruded area and a concave portion so that when the protruded area abuts the boss, the boss extends out of the body and when the boss aligns with the concave portion after the driving rod is moved, the boss springs back into the body and leaves the corresponding adjusting hole to allow the body to be pivotable relative to the connector.

9. The mobile phone charger as claimed in claim 8, wherein the top cover further has an opening, an L-shaped spring board securely attached to a bottom face of the top cover and provided with a first boss and a second boss both exposed to the opening and a cover detachably covering the opening.

10. The mobile phone charger as claimed in claim 8 further comprising a rotation clamp adapted for holding the mobile phone and rotatably connected to the top cover, the rotation clamp having a flange configured in such a manner that the flange is able to be received in the opening when the cover is removed to allow a peripheral edge abutted to a peripheral edge of the opening, a first concave defined to correspond to the first boss and second concaves corresponding to the second bosses of the spring board.

11. The mobile phone charger as claimed in claim 8, wherein the boss is provided on a seat which is formed on a bottom face of the top cover.

12. The mobile phone charger as claimed in claim 11, wherein the top cover further has an opening, an L-shaped spring board securely attached to a bottom face of the top cover and provided with a first boss and a second boss both exposed to the opening and a cover detachably covering the opening.

13. The mobile phone charger as claimed in claim 11 further comprising a rotation clamp adapted for holding the mobile phone and rotatably connected to the top cover, the rotation clamp having a flange configured in such a manner that the flange is able to be received in the opening when the cover is removed to allow a peripheral edge abutted to a peripheral edge of the opening, a first concave defined to correspond to the first boss and second concaves corresponding to the second bosses of the spring board.

14. The mobile phone charger as claimed in claim 11, wherein a recessed area is defined in the side face of the side cover to receive the one end of the driving rod.

15. The mobile phone charger as claimed in claim 14 further comprising a rotation clamp adapted for holding the mobile phone and rotatably connected to the top cover, the rotation clamp having a flange configured in such a manner that the flange is able to be received in the opening when the cover is removed to allow a peripheral edge abutted to a peripheral edge of the opening, a first concave defined to correspond to the first boss and second concaves corresponding to the second bosses of the spring board.

16. The mobile phone charger as claimed in claim 11, wherein the driving device further has a spring abutted between a side face of the side cover and a free end of the driving rod to provide a recoil force to the driving rod.

17. The mobile phone charger as claimed in claim 16 further comprising a rotation clamp adapted for holding the mobile phone and rotatably connected to the top cover, the rotation clamp having a flange configured in such a manner that the flange is able to be received in the opening when the cover is removed to allow a peripheral edge abutted to a peripheral edge of the opening, a first concave defined to correspond to the first boss and second concaves corresponding to the second bosses of the spring board.

18. The mobile phone charger as claimed in claim 16, wherein a recessed area is defined in the side face of the side cover to receive the one end of the driving rod.

19. The mobile phone charger as claimed in claim 18 further comprising a rotation clamp adapted for holding the mobile phone and rotatably connected to the top cover, the rotation clamp having a flange configured in such a manner that the flange is able to be received in the opening when the cover is removed to allow a peripheral edge abutted to a peripheral edge of the opening, a first concave defined to correspond to the first boss and second concaves corresponding to the second bosses of the spring board.

\* \* \* \* \*